United States Patent [19]

Hayashi et al.

[11] 4,074,873

[45] Feb. 21, 1978

[54] TENSION SERVO APPARATUS

[75] Inventors: Hideaki Hayashi; Susumu Kakuta, both of Mitaka, Japan

[73] Assignee: Nippon Columbia Kabushikikaisha, Tokyo, Japan

[21] Appl. No.: 747,980

[22] Filed: Dec. 6, 1976

[30] Foreign Application Priority Data

Dec. 10, 1975 Japan .................................. 50-147772
May 26, 1976 Japan .................................. 51-59995

[51] Int. Cl.$^2$ ........................................... B65H 25/22
[52] U.S. Cl. ................................. 242/75.43; 242/204
[58] Field of Search ............... 242/75.43, 75.41, 75.42, 242/75.44, 75.53, 193, 194, 191, 196, 204

[56] References Cited

U.S. PATENT DOCUMENTS

| 2,941,736 | 6/1960 | Ellmore ................................ 242/204 |
| 3,161,371 | 12/1964 | Kahn ................................. 242/75.43 |
| 3,208,681 | 9/1965 | Schober ............................... 242/204 |
| 3,235,200 | 2/1966 | Sperry ............................... 242/75.44 |
| 3,345,457 | 10/1967 | MacLeod ....................... 292/75.44 X |
| 4,000,865 | 1/1977 | Gaskins ............................. 242/75.43 |

Primary Examiner—Edward J. McCarthy

[57] ABSTRACT

A tension servo apparatus includes a brake member which may apply a braking force to a reel system. The brake member is coupled to a tension arm which is displaced in response to a tape tension and may slide on the outer periphery of said reel system in accordance with the displacement of the tension arm or the rotation of the reel system.

13 Claims, 17 Drawing Figures

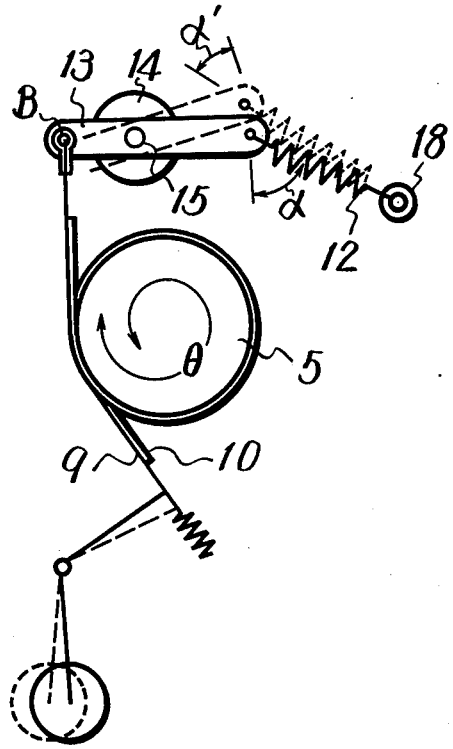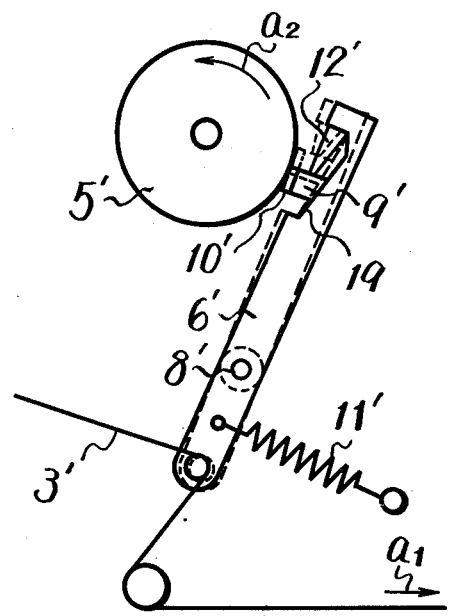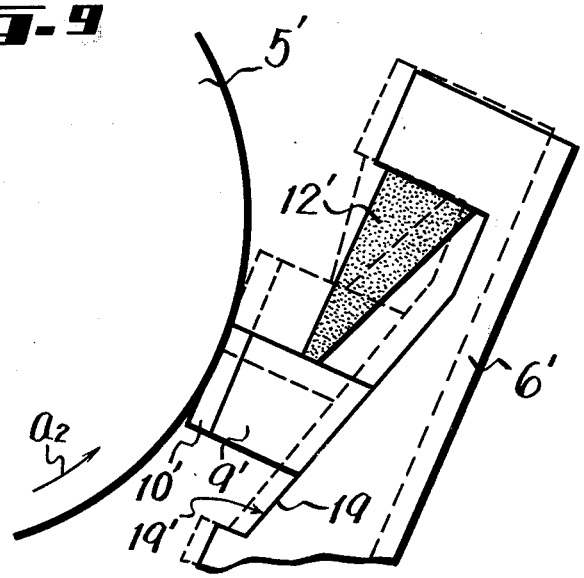

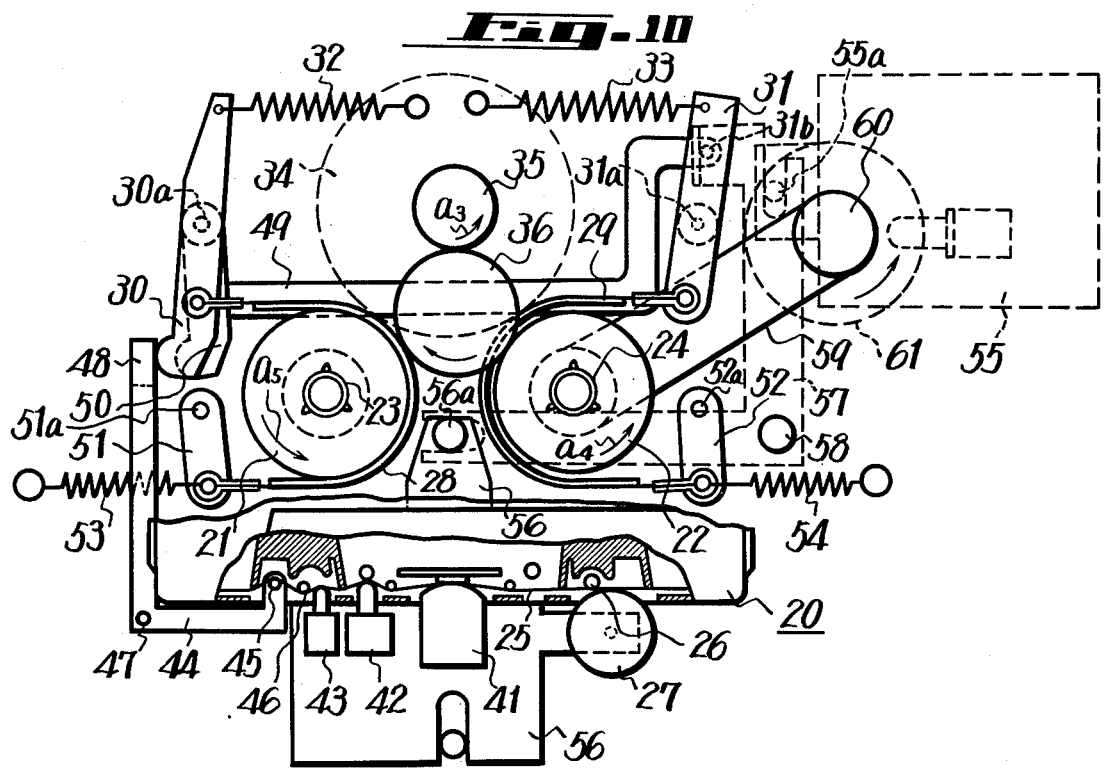
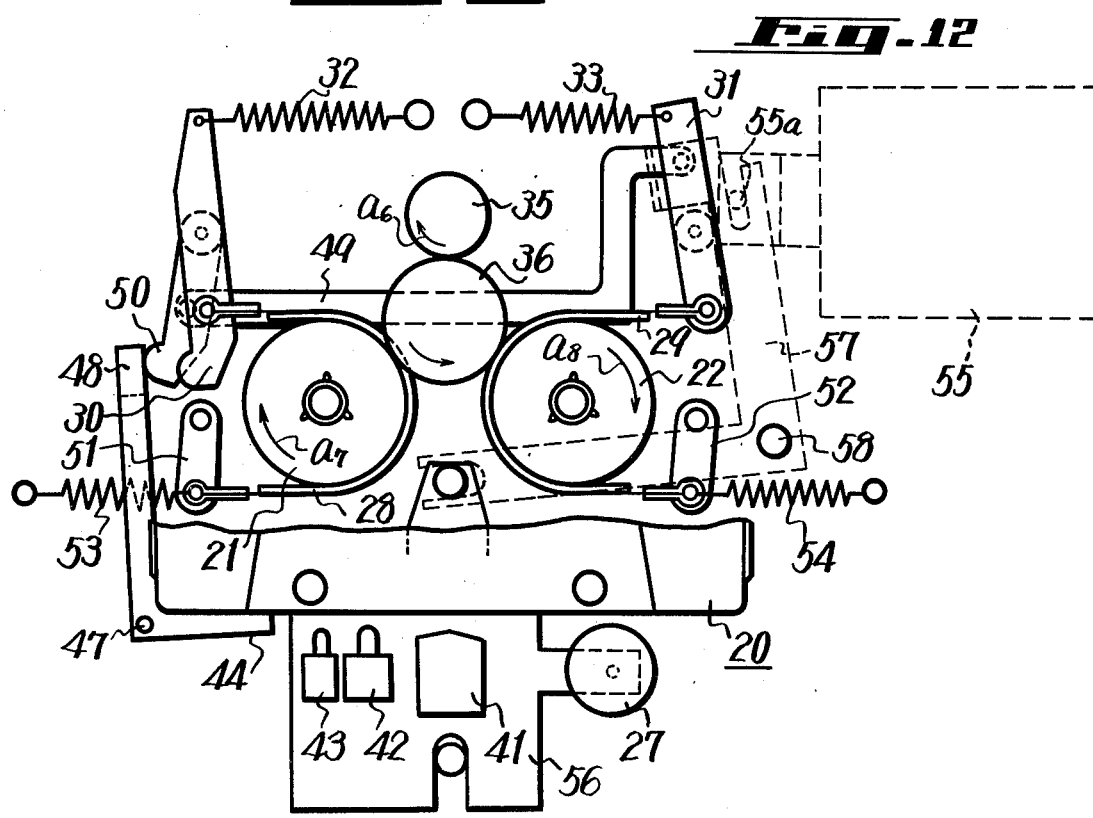

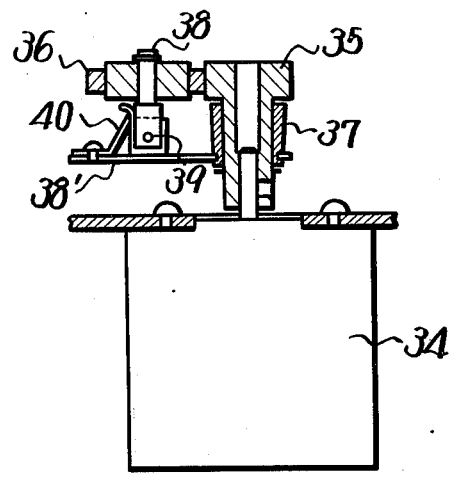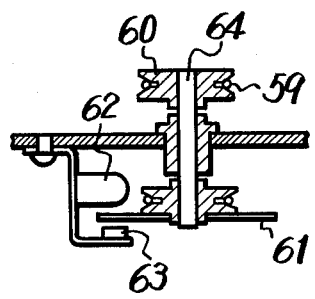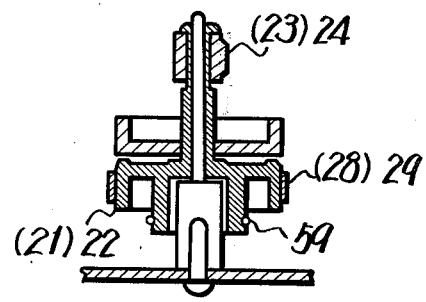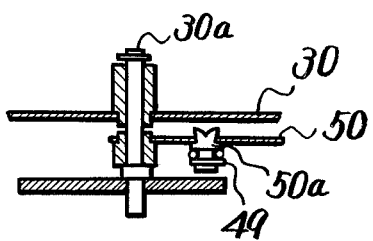

TENSION SERVO APPARATUS

BACKGROUND OF THE INVENTION

1. Field of the Invention

The present invention relates generally to a tension servo apparatus, and is directed more particularly to a mechanical tension servo apparatus for stabilizing the transportation of a tape used in, for example, a magnetic recording and/or reproducing apparatus and so on.

2. Description of the Prior Art

In a magnetic recording and/or reproducing apparatus there has been employed a so-called mechanical tension servo system which detects the tape tension, varies the mechanical braking force of a reel system and automatically makes the tape tension constant.

The prior art mechanical tension servo system uses a tension arm, which may be rotated in response to the variation of tape tension, and a brake member which may apply mechanical braking force to a reel system. In the case that the brake member consists of a brake element or piece of small size, the brake piece is attached to the tip end of the tension arm, while in the case that the brake member is formed as a band brake, one end of the band brake is attached to the tip end of the tension arm and the other end of the former is fixed to a base plate.

The above described prior art mechanical tension servo system, however, can not be free from various defects. One of the defects is that due to the inertial mass of the tension arm the phase of the operation of the tension arm is delayed for the variation of high frequencies, the variation of braking force is also delayed, and an oscillation is apt to be caused. To avoid this defect there has been proposed such a method that the braking force is applied to the brake element through viscous-elastic material to decrease the gain at high frequency where the oscillation is apt to be caused and to increase a spare phase.

In general, the friction coefficient of the brake member is changed much in accordance with temperature, moisture, using time, quality of material and so on, so that even if the servo operation is stable under a special condition as in the prior art, there will occur such a defect that due to variations of the friction coefficient the loop gain is changed much and becomes unstable or the servo system becomes less in gain.

If a condition stable for all states is set, it is only possible that the gain is very low totally under an ordinary state or the servo action is applied at very low frequency under the ordinary state. In this case, no servo action is applied at the frequencies of wow, flutter and so on and hence good servo action can not be obtained.

Another defect of the prior art is caused by the fact that reels whose diameter is changed from 3 inches to 10 inches are used. Due to the variation of the diameter, the inertial mass becomes different and also the mean value of diameters of tape roll becomes, of course, different. Thus, with the prior art stabilizing method in which the braking force is applied through only the viscous-elastic material, the gain is increased and the response frequency in the loop of the servo system is widened in the case that a reel of small size is used, so that the state is apt to be made very unstable. On the contrary, when a reel of large size is used, the response frequency becomes low and the servo action can not follow the tension variation caused by the scattering of a tape roll and the like with the result that wows occur.

OBJECTS AND SUMMARY OF THE INVENTION

It is an object of the present invention to provide a novel tension servo apparatus free from the defects encountered in the prior art.

It is another object of the invention to provide an improved tension servo apparatus with which the gain of servo is high, the servo action is stable and the gain of servo is less changed with the variation of friction coefficient to be able to keep a set gain unchanged.

It is a further object of the invention to provide a tension servo apparatus which is stable in operation even if reels of different size are used and in which the response frequency is less reduced even if a reel of large size is used to prevent wows from being caused.

According to an aspect of the present invention there is provided a tension servo apparatus which comprises a rotary member which is rotated together with a reel, a brake device provided in connection with the rotary member, the brake device including a brake element engageable with the rotary member, a device detecting the tension of a tape supplied from the reel, and a device changing the urging force of the brake element against the rotary member in accordance with a force applied to the tape tension detecting device.

The additional and other objects, features and advantages of the invention will become apparent from the following description taken in conjunction with the accompanying drawings.

BRIEF DESCRIPTION OF THE DRAWINGS

FIG. 7 is a plan view showing another example of the tension servo apparatus according to the invention;

FIG. 8 is a plan view showing a further example of the tension servo apparatus of the invention;

FIG. 9 is a plan view showing, in an enlarged scale, a part of the tension servo apparatus shown in FIG. 8;

FIGS. 10 and 12 are plan views showing a cassette tape recorder in which the tension servo apparatus of the invention shown in FIG. 1 is employed; and FIGS. 11, 13, 14 and 15 are cross-sectional views showing parts of the cassette tape recorder shown in FIGS. 10 and 12, respectively.

DESCRIPTION OF THE PREFERRED EMBODIMENTS

The description of the present invention will be hereinafter given with reference to the drawings.

Figure 1:
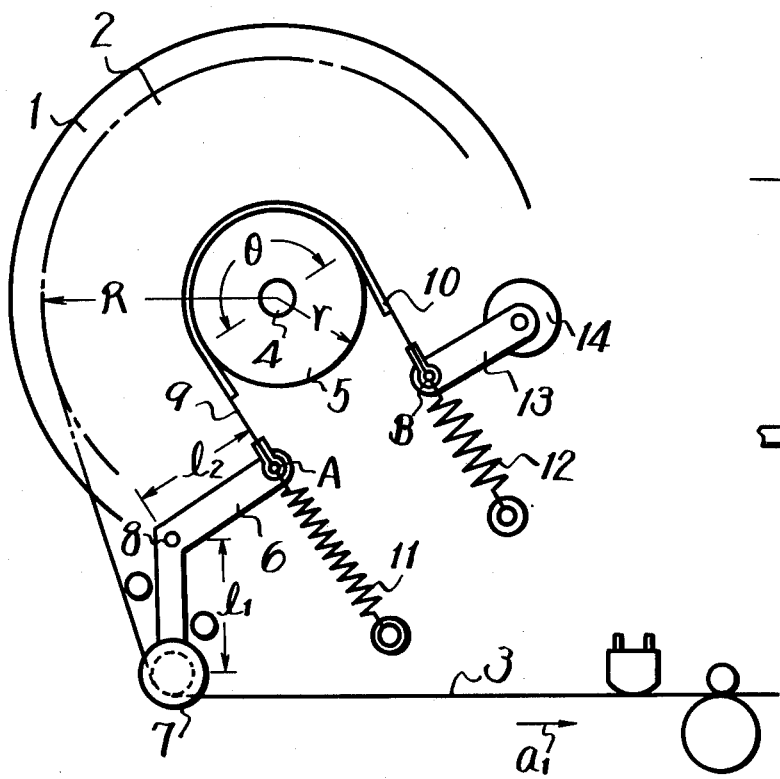
FIG. 1 is a plan view showing an example of the tension servo apparatus according to the invention.

A first embodiment of the tension servo apparatus according to the invention will be now described with reference to FIGS. 1 to 6. The tension servo apparatus shown in FIG. 1 is formed of a tension arm 6 which can be rotatable about a fulclum 8, a guide roller 7 rotatably attached to one end of the tension arm 6, a support arm 13, a rotary damper 14 attached to one end of the support arm 13, a brake band 9 stretch between the other ends A and B of the tension and support arms 6 and 13, a tension spring 11 stretched between the end A of the tension arm 6 and a base plate of fixed portion (not shown), and a back spring 12 stretched between the end B of the support arm 13 and the base plate. The brake band 9 is provided on its one side with a band brake element or lining 10 which contacts with the outer periphery of a brake wheel 5 which is rotated with a rotary shaft 4 of a reel system. The brake wheel 5 is rotatable together with a reel 1 which has a tape 2 wound thereon.

If it is assumed that a tape portion 3 of the tape 2 is transported to the right direction indicated by an arrow $a_1$ in FIG. 1, the tape 3 is given with the back tension with the frictional force between the brake wheel 5 and the brake lining 10 and hence the tape 3 pushes the tension arm 6 through the guide roller 7. Now, if the tape tension increases, the brake band 9 and hence lining 10, which is given with a force by the tension spring 11 at the point A, is given with a force by the tension arm 6, which is rotated in the counter clockwise direction about the fulcrum 8 by the increased tape tension, in such a direction that the band 9 is loosened to decrease the braking force with the result that the tape tension is decreased. In this invention the end of the brake band 9 coupled to the support arm 13 at the point B, which end is fixed in the prior art, is coupled to the base plate through the back spring 12 which is selected higher than the tension spring 11 in spring constant. This end B of the brake band 9 is further coupled to the rotary damper 14 through the support arm 13 as described above.

Figure 2:
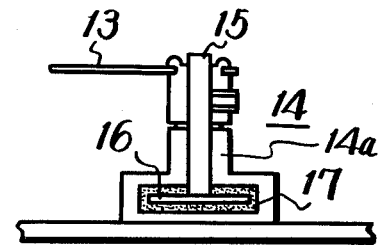
FIG. 2 is a cross-sectional view of a rotary damper used in the example shown in FIG. 1.

As shown in FIG. 2, the rotary damper 14 consists of a disc 16, a shaft 15 fixedly connected to the disc 16 and a housing 14a which contains therein viscous liquid 17 such as silicon oil or the like. The disc 16 fixed to the shaft 15 is accommodated in the housing 14a and hence the shaft 15 is rotated under the resistance of the silicon oil 17. That is, the point B serves as a spring support for the brake band 9 with resistance.

Figure 3:
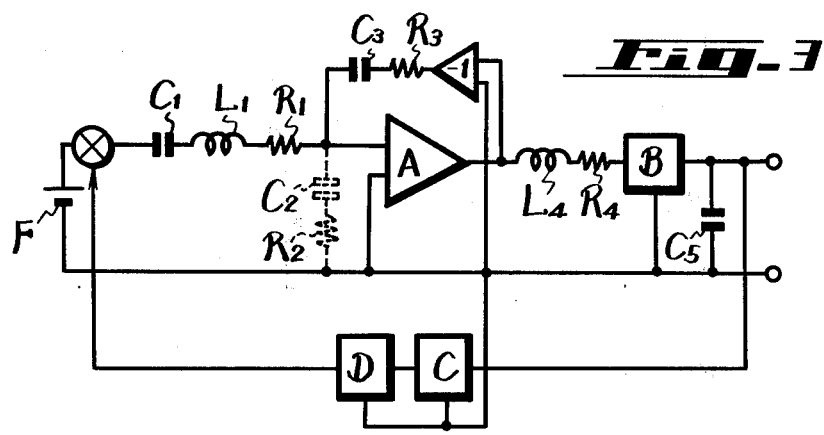
FIG. 3 is an electric equivalent circuit of the tension servo apparatus shown in FIG. 1.

If the tension servo apparatus shown in FIG. 1 is replaced with an electric equivalent circuit, FIG. 3 can be obtained, where $C_1$ represents the compliance of the tension spring 11 attached to the tension arm 6:

$L_1$ represents the equivalent mass of the tension arm system:

$R_1$ represents the axis friction resistance of the tension arm system:

$C_2$ represents the compliance of the brake lining 10:

$R_2$ represents the inner resistance of the brake lining 10:

$C_3$ represents the compliance of the back spring 12:

$L_4$ represents the inertial mass of the reel system:

$R_4$ represents the bearing resistance of the reel system:

$C_5$ represents the compliance of the tape 3 (2),

A represents the amplification degree which is the ratio between the input force of the brake member and the braking force, and which is $(e^{\mu\theta} - 1)$ in the case of the brake system where $\mu$ is the friction coefficient and $\theta$ is the brake band wrapping angle on the brake wheel 5 (refer to FIG. 1):

B represents the variation of radius of the tape wound on the reel which is expressed by $\gamma/R$ where R is the maximum radius of the wound tape on the reel and $\gamma$ is the minimum radius thereof:

C represents the ratio between the tape tension and the torquing force of the tension arm:

D represents the lever ratio of the tension arm 6 or $l1/l2$ where $l_1$ is the length of the arm 6 between the fulcrum 8 and the center of the guide roller 7, and $l_2$ is the length of the arm 6 between the fulcrum 8 and the point A: and F represents the force applied to the point A As described above, the servo loop of the tension servo apparatus of the present invention consists of a number of elements L, C and R. Therefore, it will be noted that if their constants are overlapped, the delay of the phase increases, and if the amplification degree is high, an oscillation is apt to be caused.

In the prior art, the compliance of the brake member corresponding to the above $C_2$ is increased through a viscous-elastic body and the resonance frequency at a low band, which is mainly determined together with the inertial mass $L_4$ of the reel system, is lowered by inserting a resistance component corresponding to the above $R_2$ to lower the gain at a high frequency to which the tension arm 6 does not respond.

While, with the present invention the compliance of the brake lining 10 of the brake member is not increased but is enough to be nearly zero. At the state shown in FIG. 1, the reel 1 is rotated in the counter clockwise direction, so that the force which is multiple $e^{\mu\theta}$ of the force exerting on the point A of the brake band 9 is applied to the point B. For this reason, the compliance of the back spring 12 viewed from the point A is considered as a multiple of $e^{\mu\theta}$. In the case of a band brake system, when the wrapping angle $\theta$ is great, the gain is changed much for the variation of the friction coefficient $\mu$. Due to the fact that the braking force which is multiple $(e^{\mu\theta} - 1)$ of the force at the point A is generated, if the friction coefficient $\mu$ is increased by, for example, 50 percents from $\mu = 0.3$, there is caused a variation of about two times at $\theta = \pi$ and a variation of about three times at $\theta = 2\pi$ in gain.

Figure 4A:
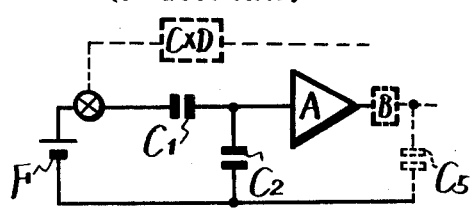
FIGS. 4A and 5A are equivalent circuits of the prior art tension servo apparatus in DC and AC point of view.
Figure 4B:
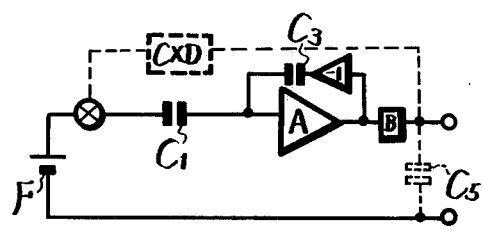
FIGS. 4B and 5B are equivalent circuits of the tension servo apparatus of the invention shown in FIG. 1 in view point of DC and AC, respectively.

If the equivalent circuit of FIG. 3 is redrawn to show a DC equivalent circuit or an equivalent circuit representing a DC tape tension variation, FIG. 4B is obtained. The corresponding equivalent circuit of the prior art tension servo apparatus can be shown in FIG. 4A.

As shown in FIGS. 4A and 4B, the amplifier portion A is supplied with a voltage proportional to the electric charges on the capacitors and amplifies the voltages, which is equal to the phenomenon that the force stored in the spring produces the braking force in mechanical point of view. As may be understood from the above, in the prior art when the amplification degree A is varied, the gain is varied in parallel from DC to AC. That is, the DC variation corresponds to the variation of the tape tension.

The gain of the solid line portion in FIG. 4A is $C_1/(C_1 + C_2)$. A, while that of the solid line portion of this invention shown in FIG. 4B is $C_1/[C_1 + (A+1)C_3]$. A. The gain of this invention is varried less for the variation of the amplification degree A, and is varied almost no. If the amplification degree A is high sufficiently, the gain becomes the value close to $(C_1/C_3)$ and hence constant irregardless of the amplification degree A. In this case, since it can be taken $A = e^{\mu\theta} - 1$, if the wrapping angle $\theta$ is selected great and the friction coefficient $\mu$ is also selected great, the gain can be made close to the ratio between the spring constants of the tension spring 11 and the back spring 12 and hence the tension servo system becomes very stable.

Figure 5A:
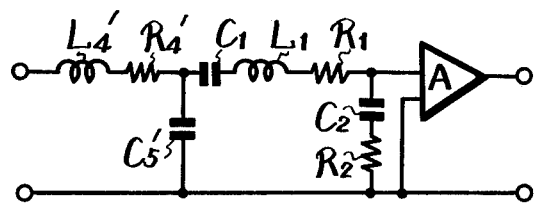
Figure 5B:
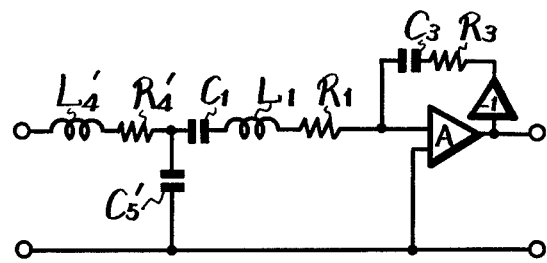
Figure 6:
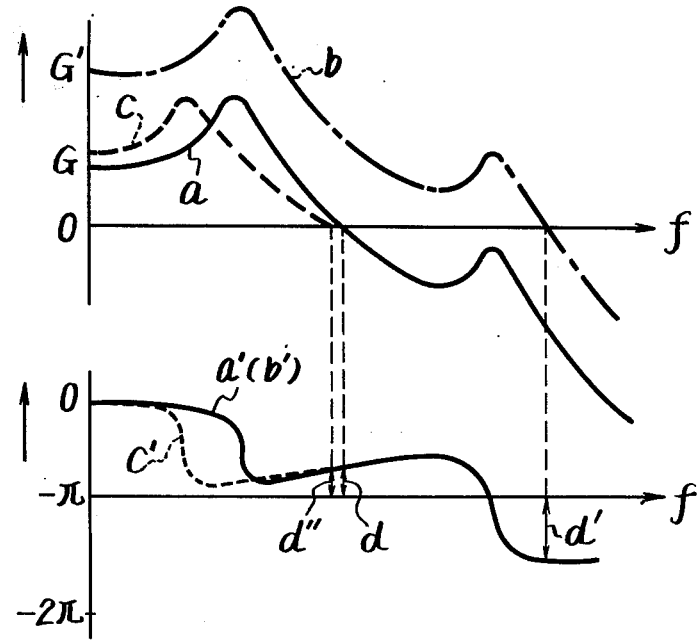
FIG. 6 is a graph showing the characteristics of the tension servo apparatus shown in FIG. 1.

An equivalent circuit of the tension servo apparatus of an open loop type in view of AC point according to the invention is shown in FIGS. 5B and that of the prior art is shown in FIG. 5A, respectively. The transfer characteristics thereof are shown in FIG. 6 in which the ordinate is the gain in dB and the abscissa the frequency. If the present invention and the prior art are set to show the same characteristics under a certain condition, the characteristics are indicated by curves $a$ and $a'$ and there is a phase spare of $d$ therebetween as shown in FIG. 6.

In the case where the amplification degree A is increased with the variation of the friction coefficient $\mu$, with the prior art the characteristics become as shown by curves $b$ and $b'$ with no variation in phase but the gain is increased parallel. Thus, it may be understood that the phase spare becomes negative as indicated by $d'$ and hence an oscillation is caused as the above state is kept.

With the present invention, in the same case, on the contrary, the characteristics becomes as shown by curves $c$ and $c'$, and the phase spare is indicated by $d''$ which is substantially same as $d$ or there is almost no difference between the spares $d$ and $d''$. As mentioned above, with the invention it is clear that even if the friction coefficient $\mu$ is varied the tension servo apparatus of the invention is stable in AC point of view.

In the above description, electric equivalent circuits are used for explaining the tension servo apparatus. However, in mechanical point of view as the friction coefficient $\mu$ increases, the amplified force at the point A is applied to the point B so much. As a result, the back spring 12 is extended and hence the force at the point A is decreased. In other words, at this time the brake band 9 is moved to loosen the tension spring 11. Thus, the negative feedback is applied to decrease the force at the point A. As mentioned above, the tension servo apparatus of the invention is stable in view of AC or oscillatory point and also in view of DC point. Therefore, the gain thereof can be determined with the spring ratio of the springs 11 and 12 not with the friction coefficient of the material of brake lining, so that it is possible that the gain of servo is ideally set.

With the prior art tension servo apparatus when a reel of small size is used, the winding radius of a tape becomes small and the inertial mass thereof becomes also small. As a result, as may be apparent from FIG. 3, the ratio $\gamma/R$ or variation B of the tape winding radius increases and the inertial mass $L_4$ of the reel system decreases. For this reason, the low resonance point in FIG. 6 becomes high and consequently whole the gain increases also. Thus, the tension servo apparatus is apt to be very unstable. While, when a reel of large size is used, the variation of tape winding radius decreases and inertial mass $L_4$ increases. As a result, the gain decreases and the frequency which can be responded becomes low. This will mean that in view of servo an oscillation or vibration is hard to be caused but the servo is not so operative for external disturbances such as scattering of tape winding and hence wow may be caused.

The above defect of the prior art can be removed with the tension servo apparatus of the present invention by automatically varying the compliance $C_3$ of the back spring 12.

Another example of the invention will be described with reference to FIG. 7 which shows the main part the second invention since the other parts are substantially same as those of that shown in FIG. 1. In the example of FIG. 7, the back spring 12 is not coupled to the support arm 13 at the point B with the right angles as in the case of FIG. 1 but is coupled to the opposite end of the support arm 13 with an angle $\alpha$ smaller than the right angles. If the back spring 12 is coupled to the support arm 13 in parallel thereto, the compliance of the back spring 12 for a fine variation of the displacement of the support arm 13 at that position is infinitive, but if with right angles the compliance of the back spring 12 is applied to the support arm 13. Accordingly, the compliance of the back spring 12 viewed from the point B becomes $(C/\cos \alpha) \cdot (L_2/L_1)$, where C represents the compliance of the back spring 12 itself and $L_2/L_1$ the lever ratio of the support arm 13 about its fulcrum 15. If it is assumed that a reel of small size is used and the servo action is carried out under the state indicated by the solid line in FIG. 7, the angle $\alpha$ is large. Therefore, the compliance is great. While, when a reel of large size is used and it tapes wrapping radius is great, the servo is applied to make the braking force great. As a result, the back spring 12 is extended as indicated by the dotted line in FIG. 7 and hence the angle $\alpha$ decreases as $\alpha'$. Thus, the compliance viewed from the point B decreases. In the latter case, the equivalent compliance of the back spring 12 (which is shown in FIG. 3 as $C_3$) decreases and the frequency range, which is responded to, becomes wide but there occurs no fear that an oscillation is caused because the gain is decreased. As described above, in the case that the tape wrapping radius is increased and the inertial mass $L_4$ of the reel system is great, the compliance $C_3$ of the back spring 12 becomes small and the frequency response range is not varied so much. For this reason, the servo is applied to the wow caused by the scattering of the tape wrapping on the reel and so on. Thus, the servo can be applied to a reel from a small size to a large size in wide range safely by this invention. The fact that the compliance of the back spring 12 can be varied is described by vectors, but it may be apparent that the same can be carried out by using a cone spring, variable pitch spring or the like. As described above, the force exerting on the back spring 12 is in proportion to the tape wrapping radius, so that the compliance of the back spring 12 can be varied with the force.

In the foregoing examples of the invention, the back spring 12 and the rotary damper 14 are provided separately, but the oil damper can be made of viscous-elastic material such as a butyl rubber. Further, only the spring can be sufficient in practice though the efficiency is lowered since the respective parts have resistance components.

In the second example of the invention shown in FIG. 7, the angle $\theta$ of the brake band 9 wound on the wheel 5 is over 360°, so that the amplification degree A is high.

FIG. 8 shows the main part of another example of the tension servo apparatus according to this invention.

In the examples of the invention shown in FIGS. 1 to 7, the band brake is employed in such a manner that the tension arm is supplied with compliance as a feedback directly.

In the example of the invention shown in FIG. 8, however, no brake band is used. That is, in place of the brake band there is employed a brake piece 9' made of elastic material. In detail, the brake piece 9' is urged against a brake wheel 5' through a brake shoe 10' by a tension spring 11' and a tension arm 6', as shown in FIG. 8. Further, a slide or recess portion 19 is provided over a certain range of an end portion of the tension arm 6' and the brake piece 9' engages with the slide portion 19. This slide portion 19 has an surface 19' which is inclined slightly against the reel axis or that of the brake wheel 5', as shown in FIGS. 8 and 9. The brake piece 9' can slide on the surface 19' of the slide portion 19 and is supported by a viscous-elastic body 12' attached to one end of the slide portion 19. When the brake wheel 5' is rotated in the counter clockwise direction as shown in FIG. 8 by an arrow $a_2$, the viscous-elastic body 12' is pressed through the brake piece 9' as clearly shown in FIG. 9 by dotted lines. If the servo is applied under the solid line state in the figure, the tension arm 6' pushes the brake piece 9' with the force difference between the spring force of the tension spring 11' and the force from the tape 3' and applies a braking force to the brake wheel 5' through the brake shoe 10' attached to the brake piece 9'. In this case, since the slide portion 19 is inclined slightly, a force component moving the brake piece 9' upwards in FIG. 8. However, the braking force between the brake wheel 5' and the brake shoe 10' acts to move the brake piece 9' to the deep end of the recess portion 19. The direction of this force is substantially same as the sliding direction of the brake piece 9' on the slide member 19, so that the viscous-elastic body 12' is urged by the brake piece 9'. When the friction coefficient between the brake wheel 5' and the brake shoe 10' increases and hence the braking force is intended to increase, the brake piece 9' slides on the slide portion 19 and the tension arm 6' also moves as shown in FIGS. 8 and 9 by dotted lines.

The electric equivalent circuit of the tension servo apparatus of the example shown in FIG. 8 is same as that shown in FIG. 3 also in view of AC point.

In the prior art tension servo apparatus, the slide portion 19 of the invention is not provided. That is, in the prior art the brake piece 9' is fixed to the tension arm 6'. Thus, the generated braking force is not fed back as a displacement of the tension arm 6' as in this invention.

As mentioned above, although the band brake system is not employed, the same effect as that of the band brake systems of the invention described previously can be obtained by the example of the invention shown in FIG. 8.

it may be possible that the braking force is applied through the viscous-elastic material as in the prior art and the feedback elements of the invention are combined with the former. However, no special effects may be obtained thereby.

An example of a cassette tape recorder, in which the tension servo apparatus of the invention shown in FIG. 1 is used, will be described with reference to FIGS. 10 to 15.

In the figures, 20 represents a cassette within which tape reels (not shown) engage with rotary shafts 23, 24 of reel tables 21, 22, respectively. When the rotary shafts 23, 24 are rotated, the reels are rotated. A tape 25 wound on the reels of the cassette 20 is driven at a constant speed by a capstan 26 and a pinch roller 27 gripped therebetween. In this case brake bands 28, 29, each having a brake lining thereon, are wound on the outer peripheries of the reel tables 21, 22 to apply braking force to the reel tables 21, 22 or the reels, respectively. One ends of the brake bands 28, 29 are attached to one ends of levers 30, 31 which are supported pivotally about fulcrums 30a, 31a, respectively. The levers 30, 31 are coupled, at the other ends thereof, to one ends of tension springs 32, 33. The other ends thereof are fixed. Thus, the tension springs 32, 33 apply tension forces to the brake bands 28, 29 respectively.

The reels mounted on the reel tables 21, 22 are driven by a reel motor 34 shown in FIG. 11. That is, a pulley 35 is attached to the rotary shaft of the reel motor 34, an idler support plate 37 is rotatably mounted on the sleeve portion of the pulley 35, and a shaft 38, which rotatably supports an idler 36 to be contactable with the pulley 35, is supported by a support member 38' attached to the idler support 37. The shaft 38 can be rotated up to parallel to the pulley 35 at fulcrum 39. When the shaft 38 is moved up by a spring 40, the idler 36 urges against the pulley 35. Through the windows formed in the front wall of the cassette 20, a reproducing head 41 at the center, a recording head 42 at the left side, and an erasing head 43 and one end portion of a tension arm 44 at the left side enter into the inside of the cassette 20 respectively, as shown in FIG. 10. In this case, a guide pin 45 planted on one end of the inwardly bent portion of the tension arm 44 contacts with the tape 25 in the cassette 20. Through the bore for the capstan at the left side, a guide shaft 46 is inserted. Thus, the tape tension of the tape 25 within the cassette 20 is detected by the guide pin 45 and the tape 25 is transported through the guide shaft 46 to the respective heads.

The tension arm 44 is rotatably supported around a fulcrum 47 and engages, at its rear end 48, directly with one end of the lever 30 for the brake band 28 or with a lever 50 which is pivoted to the lever 30 at a fulcrum 30a (refer to FIG. 15). The other ends of the brake bands 28, 29 are coupled through support levers 51, 52 which are pivoted at fulcrums 51a, 52a to one ends of back springs 53, 54, respectively, whose other ends are fixed to a fixed part (not shown), In this case, the back springs 53, 54 are selected greater than the tension springs 32, 33 in spring constant, respectively, and, though not shown, rotary dampers are provided on the rotary shafts of the support levers 51, 52 respectively.

The head group and the pinch roller 27 are mounted on a slide plate 56, and the slide plate 56 and hence the head group and the pinch roller 27 are moved through a transmission lever 57 by a plunger solenoid 55. The transmission lever 57 can be rotatable about a fulcrum 58, one end of the lever 57 engages with the brake lever 31 through a pin 31b and with the plunger solenoid 55 through a pin 55a the other end thereof engages with the slide plate 56 through a pin 56a to loosen the brake band 29, and to release the braking action when the plunger solenoid 55 is operated, as shown in FIG. 10. In FIG. 10, 49 designates an arm one end of which is pivoted by the pin 31b and the other end of which is pivoted to the lever 50 at a pivot 50a (refer to FIGS. 12 and 15) to move the lever 50 to the left or right in FIG. 10.

The operation of the cassette tape recorder will be now described. Upon reproducing and/or recording, as shown in FIG. 10, the plunger solenoid 55 is energized, so that the head group and the pinch roller 27 mounted on the slide plate 56 are brought to the position shown in the figure and hence the tape 25 is driven at the constant speed in the right direction by the pinch roller 27 and the capstan 26. At the same time, the brake band 29 is released from the reel table 22, the reel motor 34 and hence the pulley 35 are rotated in the counter clockwise direction as shown in FIG. 10 by arrow $a_3$, then the idler support plate 37 (refer to FIG. 11) is moved to the right in FIG. 10, and accordingly the idler 36 engages with the reel table 22 to rotate the latter in the counter clockwise direction as shown in FIG. 10 by an arrow $a_4$. Thus, the tape 25 is taken up by the reel through the rotary shaft 24. At this time, the tape tension is detected by the guide pin 45 and the rotary shaft 23 is supplied with back tension by the brake band 28 through the reel table 21. In this case, since the reel table 21 is rotated in the counter clockwise direction as indicated by an arrow $a_5$ in FIG. 10, a force is applied to the back spring 53 by the friction between the brake band 28 and the reel table 21 to extend the back spring 53. Thus, the brake band 28 is rotated in the counter clockwise direction and the lever 30 is moved to the left in FIG. 10. The tape tension detected by the guide pin 45 exerts on the lever 30 through the rear end 48 of the tension arm 44. Therefore, when the back tension is great, the tape tension increases and the force of the tape 25 exerting on the guide pin 45 increases. Thus, the rear end 48 of the arm 44 pushes the lever 30 to the right in FIG. 10 to loosen the brake band 28. While, when the tape tension is small, the brake band 28 is not loosened so much. As a result, the braking force by the brake band 28 exerting on the reel table 21 increases to high the tape tension. As described above, the tension servo apparatus of the invention acts to keep the tape tension on the surfaces of the heads always constant.

Upon rewinding the tape 25, as shown in FIG. 12, the plunger solenoid 25 is de-energized and the brake bands 28, 29 act on the reel tables 21, 22 respectively. At this time, the reel motor 34 and hence the pulley 35 are rotated in the clockwise direction indicated by an arrow $a_6$ in FIG. 12, so that the idler 36 is engaged in turn with the reel table 21 and the rotation of the pulley 35 is transmitted to the reel table 21 to rotate the latter. If a load is applied to the reel on the reel table 21, the idler 36 is urged to the reel table 21 with greater force to rotate the reel in the clockwise direction, as indicated by an arrow $a_7$ in FIG. 12. In this case, since the spring constants of the tension springs 32 and 33 are lower than those of the back springs 53, 54 respectively, the braking force acts on the reel table 21 low in the rotation in the clockwise direction but high in the counter clockwise direction. On the contrary, the braking force acts on the reel table 22 high in the clockwise direction but low in the counter clockwise direction. Therefore, the reel table 21 and hence the reel thereon is rotated in the clockwise direction, and at this time a force is the clockwise direction is applied to the brake band 28 through the friction therebetween. As a result, the brake band 28 is moved to shrink the back spring 53. While, the reel table 22 and hence the reel thereon is rotated in the clockwise direction as indicated by an arrow $a_8$ in FIG. 12 and a back tension is applied to the tape by the brake band 29 frictionally engaged with the reel table 22. At this time, since a force is applied to the brake band 29 to rotate it in the clockwise direction, the back spring 54 is extended. Due to the force difference between those applied to the springs 53, 54, the lever 50 is moved to the left in FIG. 12 as compared with the lever 30 through the brake band 29, lever 31 and arm 49. At this time, the tape tension is applied to the guide pin 45 similar to that at the constant speed drive of the tape. Thus, when the tape tension increases, the tension arm 44 is rotated about the fulcrum 47 in the clockwise direction and hence its rear end 48 pushes the lever 50 to the right in FIG. 12 with the result that the arm 49 is moved to the right in FIG. 12, then the lever 31 is rotated about the fulcrum 31a in the clockwise direction and the brake band 29 is loosened to decrease the braking force and then to decrease the tape tension. On the contrary, when the tape tension is small, the force applied to the lever 50 through the guide pin 45 and the rear end 48 of the arm 44 decreases of increase the braking force by the brake band 28 and the tape tension is increased. As a result, the tape tension upon the tape rewinding is kept constant.

Upon the fast forward, the plunger solenoid 55 is de-energized as in the case of the normal rewinding and the reel motor 34 and hence the pulley 35 is rotated in the counter clockwise direction as shown in FIG. 10. As a result, the operations opposite to those upon the normal rewinding are carried out and the lever 30 is moved to the left beyond the lever 50 as shown in FIG. 10 to make the back tension constant.

In this case, since the guide shaft 46 is inserted into the bore corresponding to the capstan of the cassette 20, the winding angle of the tape 25 on the guide pin 45 planted on the tip end of the tension arm 44 becomes great. Thus, the force of the tape 25 exerting the tension arm 44 increases. As a result, the accuracy and responsibility of tape tension detection increase. In this case, even if the erasing head 43 engages with the tape 25 as shown in FIG. 10, the tape winding angle on the guide pin 45 is not changed. Therefore, the detection of the tape tension is not disturbed and hence is stable.

Further, it is also possible that a belt 59 is stretched between the reel table 22 (or 21) and a rotation detector to rotate the latter and hence to servo the tape winding tension. An example of the rotation detector will be described with reference to FIG. 13. As shown in FIGS. 13 and 14, the belt 59 is used to rotate a pulley 60 supported by a shaft 64. A disc 61 is attached to the shaft 64 of the pulley 60, which disc 61 is provided with a plurality of slits (not shown) therethrough, to be rotated together with the pulley 60. The plurality of slits are same in shape and arranged on a circle at the same pitch. A light source 62 such as a lamp and a light receiving element 63 such as a CDS or the like are disposed in opposed relation through the slits of the disc 61. Thus, the light receiving element 63 produces an AC signal which is proportional to the rotation number of the reel on the reel table 22 in frequency. Thus, if the AC signal from the light receiving element 63 is frequency-demodulated, the rotation speed of the reel table 22 can be detected. Then, upon the tape travelling at the constant speed as shown in FIG. 10, if a current fed to the reel motor 34 is controlled by the above rotation detector or in response to the rotation speed detected by the rotation detector, the winding tension of the tape can be made constant. That is, the current fed is the motor 34 is reduced when the detected rotation speed is high, but increased when the detected rotation speed is low. This control can be effect easily by supplying the output signal from the rotation detector to the amplifier for motor driving in reversed phase. By this manner it is possible that when the tape amount wound on the reel shaft or at the start of the tape winding on the reel shaft, the tape tension will increase but the torque can be reduced by reducing the current applied to the motor since the rotation speed is high. While, at the termination of the tape winding the tape radius on the reel shaft is increased normally and hence the tape tension is reduced, but the rotation speed becomes low. Thus, the torque of the motor is increased and the tape is wound at the constant tape tension.

The above description is given on the case that the tension servo apparatus of this invention is employed in the cassette tape recording and/or reproducing apparatus, but the tension servo apparatus of the invention can be employed in a recording and/or reproducing apparatus of an open reel type.

As described above, with the employment of the tension servo apparatus according to the present invention, even if there are factors such as the reels, guides and so on which will cause the tape tension unstable, the tape tension can be made constant always by the tension servo apparatus. Therefore, wows, flutters, level variations and so on can be reduced and hence the tone quality can be improved much.

Further, since the tape tension difference between the supply and take-up reels is small, the urging force of the pinch roller against the capstan is sufficient in small with the result that the plunger solenoid can be reduced in size. Thus, even in the ease that the apparatus is operated manually, only small force is required to operate it and hence the operational property is improved.

Further, during the fast forward the tape tension can be kept constant, so that no scattering is caused in tape winding and the tape is prevented from being damaged.

Further, the above effects of the invention can be carried out by applying the tension servo to two reels with the employment of a single tension arm, which also improves the property.

In addition, the present invention can eliminate such a defect that the gain of brake parts are changed by circumstances, time lapse and so on to cause an oscillation and the servo action is decreased, and the present invention always carried out predetermined operational stably. Further, it is possible that even if a reel size is changed the frequency responsibility is prevented from being changed and the variation of stability between a large reel and a small reel is avoided.

It may be apparent that many modifications and variations could be effected by one skilled in the art without departing from the spirits or scope of the novel concepts the present invention so that the scope of the invention should be determined by the appended claims.

We claim as our invention:

1. A mechanical tension servo apparatus for maintaining the tension of a reel-transported tape substantially constant comprising:
   means for mounting said reel for rotation,
   a rotary member connected to said means and conjointly rotatable with said reel;
   brake means including a brake element engageable with said rotary member and resilient biasing means for exerting a selected force thereon
   tension detecting means for detecting the tension of a tape being transported from said reel;
   means for regulating said biasing means to vary the force of said brake element against said rotary member in accordance with changes in the force applied to said tape tension detecting means, whereby
   the biasing force is decreased in response to an increase in tape tension and is increased in response to a decrease in tape tension.

2. A tension servo apparatus as claimed in claim 1, in which said brake element consists of a brake band and a brake lining attached to said band.

3. A tension servo apparatus as claimed in claim 2, in which one end of said brake band is coupled to a first resilient member and the other end thereof is coupled to a member which offers viscous resistance.

4. A tension servo apparatus as claimed in claim 3, in which means is provided for changing the resiliency of said first member in accordance with a braking force.

5. A tension servo apparatus as claimed in claim 1, in which said tape tension detecting means includes a tension arm one end of which can be inserted into a cassette through a window formed in a front wall of said cassette and contact with a tape in said cassette.

6. A tension servo apparatus as claimed in claim 3, in which said first member is a spring and said second member is a rotary damper.

7. A tension servo apparatus as claimed in claim 5, in which said tension arm has a slide portion with a surface inclined with respect to a rotary axis of said rotary member, said brake element being disposed on said inclined surface of said slide portion and slidable therealong while engaging with the outer periphery of said rotary member.

8. A tension servo apparatus as claimed in claim 1, in which said rotary member is a brake wheel.

9. A tension servo apparatus as claimed in claim 7, in which a support is provided in said slide portion for elastically supporting said brake element.

10. A tension servo apparatus as claimed in claim 2, in which said brake band engages with an outer periphery of said rotary member over an angular range of about 180°.

11. A tension servo apparatus as claimed in claim 10, in which said angular range is more than 360°.

12. A mechanical tension servo apparatus for maintaining the tension of a reel-transported tape substantially constant comprising:
   at least one rotatable reel;
   a rotary member rotatable with said reel;
   brake means including a brake element engageable with said rotary member with a selected biasing force;
   tension detecting means for detecting the tension of a tape being transported by said reel;
   means for regulating said biasing force of said brake element against said rotary member in accordance with changes in the force applied to said tape tension detecting means; and
   said brake means including means for resiliently positioning said brake element relative to said rotary member responsive to increases and decreases in tape tension whereby the biasing force is decreased in response to an increase in tape tension and is increased in response to a decrease in tape tension, said brake element being coupled at one end thereof to a first resilient member and at the other end thereof to a second member offering viscous resistance.

13. A mechanical tension servo apparatus for maintaining the tension of a reel-transported tape substantially constant comprising:
   at least one rotatable reel;
   a rotary member rotatable with said reel;
   brake means including a brake element engageable with said rotary member with a selected biasing force;

tension detecting means for detecting the tension of a tape being transported by said reel;

means for regulating said biasing force of said brake element against said rotary member in accordance with changes in the force applied to said tape tension detecting means;

said brake means including means for resiliently positioning said brake element relative to said rotary member responsive to increases and decreases in tape tension whereby the biasing force is decreased in response to an increase in tape tension and is increased in response to a decrease in tape tension; and said tape tension detecting means including a tension arm, one end of which is insertable into a cassette window formed in the front wall thereof, said one end of said tension arm being adapted to contact a tape within said cassette.

* * * * *